(12) United States Patent
Tamada et al.

(10) Patent No.: US 7,079,479 B2
(45) Date of Patent: Jul. 18, 2006

(54) OPTICAL STORAGE MEDIUM HAVING AN ORGANIC RECORDING LAYER ATTACHED TO A DIELECTRIC LAYER

(75) Inventors: Sakuya Tamada, Tokyo (JP); Hidetoshi Watanabe, Chiba (JP)

(73) Assignee: Sony Corporation, Tokyo (JP)

( * ) Notice: Subject to any disclaimer, the term of this patent is extended or adjusted under 35 U.S.C. 154(b) by 553 days.

(21) Appl. No.: 10/006,958

(22) Filed: Dec. 4, 2001

(65) Prior Publication Data

US 2002/0122379 A1    Sep. 5, 2002

(30) Foreign Application Priority Data

Dec. 6, 2000    (JP)    ............................ P2000-372089

(51) Int. Cl.
*G11B 7/24* (2006.01)
*B32B 3/02* (2006.01)

(52) U.S. Cl. .................................. 369/275.5; 428/64.4
(58) Field of Classification Search ............ 369/275.5, 369/275.2, 275.1, 275.4, 275.3; 428/64.4, 428/64.1; 430/270.13, 320, 321
See application file for complete search history.

(56) References Cited

U.S. PATENT DOCUMENTS

| | | | | |
|---|---|---|---|---|
| 4,504,548 | A | * | 3/1985 | Esho et al. .................... 369/94 |
| 4,984,231 | A | * | 1/1991 | Yasuoka et al. .......... 369/275.1 |
| 5,260,165 | A | * | 11/1993 | Satou et al. ................. 369/284 |
| 5,371,730 | A | * | 12/1994 | Maeda et al. ................ 369/286 |
| 5,498,507 | A | * | 3/1996 | Handa et al. ............. 430/273.1 |
| 6,049,521 | A | * | 4/2000 | Aratani ..................... 369/275.1 |
| 6,115,351 | A | * | 9/2000 | Utsunomiya et al. .... 369/275.2 |
| 6,146,733 | A | * | 11/2000 | Inoue et al. ................ 428/64.1 |
| 6,154,437 | A | * | 11/2000 | Utsunomiya et al. .... 369/275.2 |
| 6,329,035 | B1 | * | 12/2001 | Iwasaki et al. ............. 428/64.1 |
| 6,329,036 | B1 | * | 12/2001 | Kikukawa et al. ......... 428/64.1 |
| 6,366,541 | B1 | * | 4/2002 | Ohnuki et al. ........... 369/13.35 |
| 6,440,333 | B1 | * | 8/2002 | Masuhara ................... 264/1.33 |
| 6,656,559 | B1 | * | 12/2003 | Mizushima et al. ........ 428/64.1 |
| 6,660,452 | B1 | * | 12/2003 | Iwasaki et al. ......... 430/270.13 |
| 6,731,590 | B1 | * | 5/2004 | Shingai et al. ........... 369/275.1 |
| 6,731,591 | B1 | * | 5/2004 | Hayashida et al. ......... 369/286 |
| 6,733,858 | B1 | * | 5/2004 | Mizushima et al. ........ 428/64.1 |

* cited by examiner

*Primary Examiner*—Tan Dinh
(74) *Attorney, Agent, or Firm*—Sonnenschein Nath & Rosenthal LLP (57) ABSTRACT

A dielectric part 4 comprising a nitride layer 7 and an oxide layer 8, laid one upon the other, is formed on a data-recording layer 3. A light-transmitting layer 5 is boned with adhesive to the dielectric part 4. Since the dielectric part 4 is interposed between the data-recording layer 3 and the light-transmitting layer 5, the organic material of the data-recording layer 3 does not diffuse into the adhesive that bonds the light-emitting layer to the dielectric layer 4. Additionally, the data-recording layer 3 is not deteriorated due to the oxygen plasma generated during the process of forming the oxide layer 8, because the oxide layer 8 is provided on the nitride layer. Since the nitride layer 7 has a thickness of 10 nm or less, it does not influence optical enhancement effect.

1 Claim, 8 Drawing Sheets

OPTICAL STORAGE MEDIUM HAVING AN ORGANIC RECORDING LAYER ATTACHED TO A DIELECTRIC LAYER

BACKGROUND OF THE INVENTION

1. Field of the Invention

The present invention relates to an optical disc comprising a light-transmitting layer and a data-recording layer, in which light may be applied to the data-recording layer through the light-transmitting layer, thereby to record and reproduce data on and from the data-recording layer.

2. Description of the Related Art

Optical discs have been commonly used. Each optical disc comprises a data-recording layer, a reflection layer and the like that are laid on upon another. Light may be applied to the data-recording layer to record data. Attempts have been made to enhance the recording density of optical discs, in order to record as much data as possible on each optical disc.

The density at which data is recorded on an optical disc can be increased by taking two measures. First, a laser beam having a short wavelength is applied to the optical disc incorporated in a recording/reproducing apparatus. Second, an objective lens having a large numerical aperture (hereinafter referred to as "NA") is incorporated into the recording/reproducing apparatus. More specifically, a semiconductor laser made of nitride semiconductor InGaN and emitting a laser beam having a wavelength of about 400 nm may be utilized, and an objective lens having NA of 0.8 or more may be used, thereby to increase the storage capacity of the optical disc.

Figure 1:
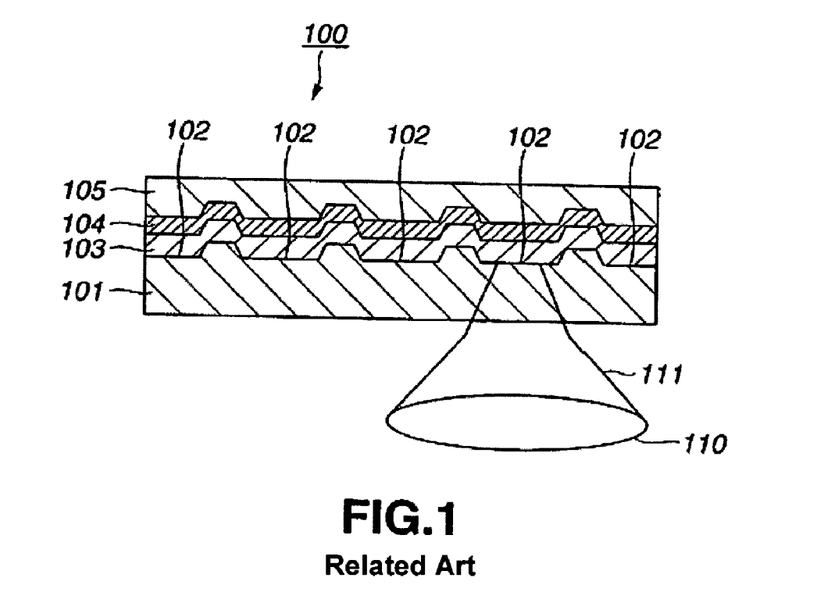
FIG. 1 is a sectional view of a conventional optical disc.

A write once optical disc, which is one type of a conventional writable optical disc, is known. As shown in FIG. 1, the write once optical disc 100 comprises a transparent substrate 101 having a thickness of, for example, 1.2 mm. A guide groove 102 is cut in one major surface of the substrate 101, providing a signal-recording region. A data-recording layer 103 is provided on the signal-recording region, a reflection film 104 is formed on the guide groove 102, and a protection film 105 is laid on the reflection film 104. Thus, the optical disc 100 is a multi-layered one.

To record data signals on the write once optical disc 100, a laser beam 111 focused by the objective lens 110 for optical pickup incorporated in a recording/reproducing apparatus (not shown) is applied to the guide groove 102 through the substrate 101. Any part of the data-recording layer 103, irradiated with the laser beam 111, is heated and degenerated. A record pit (not shown) that represents a data signal is thereby made in the data-recording layer 103.

To read data signals from the data-recording layer 103, a laser beam 111 that has lower intensity than the beam applied to record data signals is applied to the signal-recording region. The presence or absence of a record pit is detected from the intensity of the beam reflected from the signal-recording region. A reproduced signal that represents the presence or absence of a record pit is thereby generated.

As indicated above, the write once optical disc 100 has a substrate 101 that is 1.2 mm thick. The laser beam 111 is applied through the substrate 101 to the data-recording layer 103. Generally, an objective lens having a large NA is used to increase the recording density of the optical disc. If so, the thicker the light-transmitting layer (i.e., substrate 101 in the case of the write once optical disc 100) through which a laser beam passes, the more greatly the skew angle of the light-transmitting layer will influence the shape of the beam spot. It follows that the thickness of the light-transmitting layer should be reduced to record data on the optical disc at highly recording density.

Figure 2:
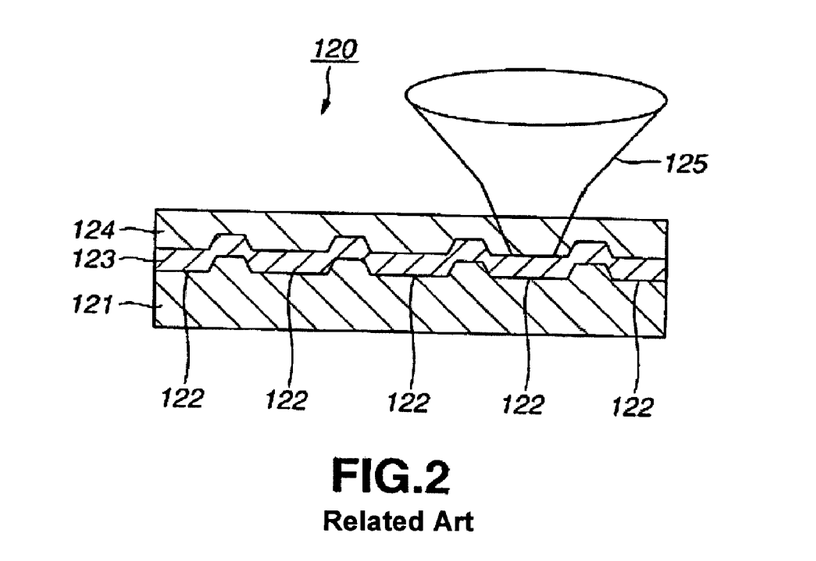
FIG. 2 is a write once optical disc to which blue laser beams are applied to record and reproduce data on and from it.

To accomplish high-density recording by using an objective lens of a large NA and by applying a laser beam of a short wavelength, such a rewritable optical disc 120 as is shown in FIG. 2 has been proposed. The rewritable optical disc 120 comprises a substrate 121. A guide groove 122 is cut in one major surface of the substrate 121, forming a signal-recording region. A data-recording, layer 123 is provided on the signal-recording region, and a light-transmitting layer 124 is laid on the data-recording layer 123. A blue laser beam 125 having a wavelength ranging from 380 nm to 450 nm is applied to the data-recording layer 123 through the light-transmitting layer 124.

The light-transmitting layer 124 may be made of ultraviolet-curing resin. Alternatively, the layer 124 may be a transparent film of polycarbonate or the like, adhered to the data-recording layer 123 with an adhesive agent. The light-transmitting layer 124 is preferably 10 to 177 µm thick if the objective lens used has an NA of 0.78 or more.

Data can be recorded on the rewritable optical disc 120 at a high density when a laser beam is applied to the layer 123 through the light-transmitting layer 124 that is thin. This is because the objective lens has a large NA and the laser beam applied has a short wavelength.

The data-recording layer of the rewritable optical disc 120 may be made of phase-change recording material such as Ge—Sb—Te or Ag—In—Sb—Te.

If made of phase-change material, the data-recording layer has a large absorption coefficient. Therefore, the data-recording layer cannot acquire, in principle, a high reflectance. Optical discs having a data-recording layer made of phase-change material need to exhibit a reflectance of about 15% to 25% before data is recorded on it. In view of this, the next-generation, high-density optical discs should be standardized to exhibit low reflectance.

In recent years, however, inexpensive write once optical discs having a recording layer made of organic material are more demanded. Organic materials are being developed for optical discs to which blue laser beams are applied to record and reproduce data.

As described above, the rewritable optical disc 120 needs to exhibit reflectance of about 15% to 25% (hereinafter called "initial reflectance") before data is recorded on it. It is desired that write once optical discs to which blue laser beams are applied should have an initial reflectance of 15% to 25%, too. An optical disc may acquire an initial reflectance of 15% to 25% if the organic material of its data-recording layer has a refractive index n of 2.3 or more, as is disclosed in Japanese Patent Application No. 2000-086687.

However, few organic materials are available, which have a refractive index of 2.3 or more and which can therefore be used as material of data-recording layers. Some organic materials have indeed a refractive index of 2.3 or more. However, they are not sufficiently resistant to heat or weather, do not exhibit an absorption spectrum suitable for the wavelength of blue laser beams. Nor are they amorphous enough to inhibit noise.

In consideration of the manufacturing cost and mass-productivity of write once optical discs, it is desirable to bond a light-transmitting layer to the data-recording layer made of organic material, by applying an adhesive. If a light-transmitting layer is bonded to the data-recording layer, however, the organic material may diffuse into the adhesive or may react with the adhesive. Consequently, the data-recording layer will deteriorate. This is probably because the organic material dissolves into the solvent contained in the adhesive, such as acetic acid polymer. It is therefore required that a dielectric part be formed on the data-recording layer, thereby to prevent the adhesive from diffusing into the data-recording layer.

The data-recording layer may be made of organic material that has an refractive index of less than 2.3. In this case, the freedom of choosing the material increases. However, the optical disc can no longer acquire an initial reflectance of 15% to 25%. To raise the initial reflectance of optical discs to 15% to 25%, a dielectric part may be formed on the data-recording layer, causing multiple interference to attaining an optical enhancement effect. In order to achieve an optical enhancement effect, the dielectric part should be made of material that has so small a refractive index as possible.

As mentioned above, a dielectric part must be formed on the data-recording layer and the data-recording layer must have so small a refractive index as possible and be so high a density as possible. This holds true no matter whether the data-recording layer is made of an organic material that has a refractive index of at least 2.3 or an organic material that has a refractive index of less than 2.3.

Examples of materials that have small refractive indices are fluorides such as $MgF_2$ and oxides such as $SiO_2$. Films of these materials can be formed by RF-plasma sputtering. Alternatively, $MgF_2$ films can be formed by vapor deposition, and $SiO_2$ films can be formed by electron-beam vapor deposition. If these methods are employed to form dielectric parts of $MgF_2$ or $SiO_2$, however, the dielectric parts cannot be formed fast. Consequently, the optical discs cannot be mass-produced as efficiently as is desired. The methods specified above can hardly provide dielectric parts that have a desired composition. That is, the dielectric parts thus formed exhibit but insufficient transparency and inadequate surface smoothness.

Reactive sputtering that uses a silicon target and oxygen plasma may be carried out to form an $SiO_2$ film. This method can indeed form an $SiO_2$ film at a sufficiently high speed. However, the organic substance used is degenerated due to the oxygen plasma that is generated during the process of forming the $SiO_2$ film. This inevitably deteriorates the data-recording layer 3.

For the reason given above, it is difficult to form a fluoride such as an $MgF_2$ film or an oxides such as an $SiO_2$ film, directly on the data-recording layer.

BRIEF SUMMARY OF THE INVENTION

The present invention has been made in view of the foregoing. An object of the invention is to provide an optical disc in which light is applied to the data-recording layer through the light-transmitting layer to record and reproduce data on and from the data-recording layer. The optical disc is so configured that the data-recording layer does not deteriorate, though the light-transmitting layer is bonded to it with adhesive.

An optical disc according to this invention comprises a substrate, a data-recording layer made of organic material, a dielectric part provided on the data-recording layer, and a light-transmitting layer provided on the dielectric part. Data can be recorded reproduced on and from the optical disc by applying a laser beam to the data-recording layer through the light-transmitting layer. The dielectric part comprises a nitride layer contacting the data-recording layer and an oxide layer or a fluoride layer laid on the nitride layer. The nitride layer has a thickness of at most 10 nm.

In the optical disc of this invention, the dielectric part is formed on the data-recording layer. Hence, the data-recording layer never contacts the adhesive that bonds the light-transmitting layer to the dielectric part. This prevents the organic material of the data-recording layer from deteriorating.

In the optical disc according to the invention, the dielectric part comprises a nitride layer and an oxide layer or fluoride layer laid on the nitride layer. Thus, even if reactive sputtering forms the oxide layer, the oxygen plasma generated during the reactive sputtering does not deteriorate the organic material of the data-recording layer.

The nitride layer has a thickness of 10 nm or less in the optical disc of the present invention. Therefore, the nitride film does not hinder the optical enhancement effect in spite of its great refractive index. The optical disc can have a sufficient reflectance before data is recorded on it.

In the optical disc according to the present invention, an oxide layer or a fluoride layer, either having a small reflective index, is formed on the nitride layer. Therefore, the optical disc can achieve optical enhancement effect by virtue of multiple interference and can exhibit a sufficiently high reflectance before data is recorded on it. In addition, the dielectric part can have an adequate mechanical strength.

In an optical disc according to the present invention, a dielectric part is provided on the data-recording layer and a light-transmitting layer is bonded with adhesive to the dielectric part. Therefore, the adhesive does not contact the data-recording layer. The organic material of the data-recording layer will not diffuse into the adhesive to deteriorate the data-recording layer.

In the optical disc according to this invention, a nitride layer is formed on the data-recording layer and an oxide layer or a fluoride layer is provided on the nitride layer. Therefore, the oxygen plasma generated during the process of forming the oxide layer by reactive sputtering does not deteriorate the organic material of the data-recording layer. In addition, the optical disc excels in mass-productivity, because the dielectric part can be formed by means of reactive sputtering.

In the optical disc of this invention, the oxide layer provided on the nitride layer has a low refractive index. The optical disc can therefore achieve an optical enhancement effect. Moreover, the nitride film does not hinder the optical enhancement effect in spite of its great refractive index, because its thickness is only 10 nm or less. The reflectance the optical disc acquires after it records data is greatly different from the reflectance it exhibits before it records the data. This imparts good signal-recording/reproducing characteristic to the optical disc.

DETAILED DESCRIPTION OF THE INVENTION

An optical disc according to the present invention will be described in detail, with reference to the accompanying drawings.

Figure 3:
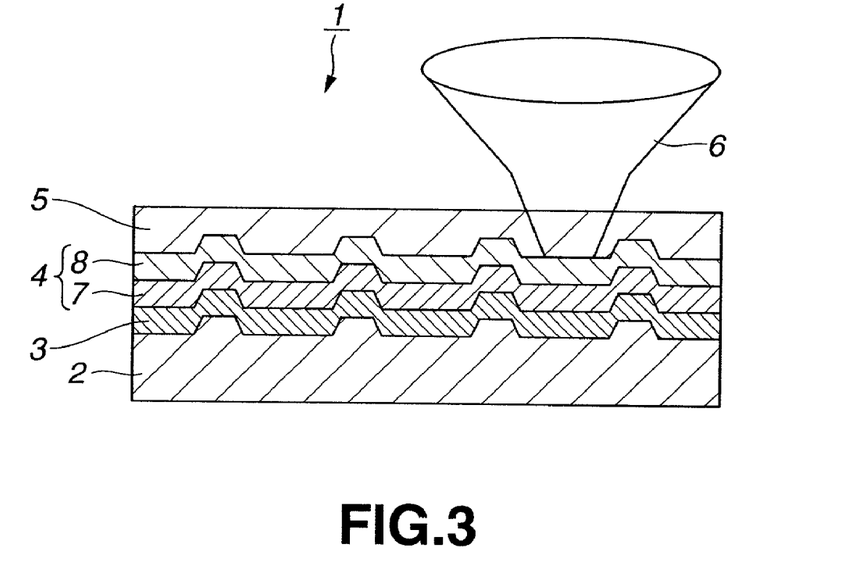
FIG. 3 is a sectional view of an optical disc according to this invention.

As FIG. 3 shows, the optical disc 1 comprises a substrate 2, a data-recording layer 3, a dielectric part 4, and a light-transmitting layer 5. The data-recording layer 3 is laid on the substrate 2. The dielectric part 4 is laid on the data-recording layer 3. The light-transmitting layer 5 is bonded to the dielectric part 4 with adhesive.

When laser beams 6 having wavelengths of 380 nm to 450 nm are applied to the data-recording layer 3 through the light-transmitting layer 5, a data signal is recorded on and reproduced from the optical disc 1. The optical disc has reflectance of about 15% to 25% (hereinafter called "initial reflectance") before data is recorded on it. It meets the standards of the next-generation, high-density optical discs that should exhibit reflectance of 0% to 10% after data is recorded on them.

The substrate 2 is a disc that has a thickness of 1.2 mm. It is made of, for example, polycarbonate resin, amorphous polyolefine resin, or the like.

The data-recording layer 3 is provided to record data signals. It is made of organic material. The organic material has its reflectance changed to record data signals. The data-recording layer 3 has been formed by coating the substrate 2 with a solution prepared by dissolving an organic dye in tetrafluoropropanol. Examples of the organic dye are cyanine-based dye, merocyanine-based dye, porphyrin-based dye, pyrylium-based dye, naphtoquinone-based dye, anthraquinone-based dye, indophenol-based dye or the like.

The light-transmitting layer 5 is made of, for example, polycarbonate resin. The layer 5 protects the data-recording layer 3 and allows passage of light applied from a recording/reproducing apparatus. The light that has passed through the light-transmitting layer 5 is applied to the data-recording layer 3.

The dielectric part 4 is composed of a nitride layer 7 and an oxide layer 8, which are laid one upon the other. The nitride layer 7 is made of, for example, $Si_3N_4$, AlN or the like. The oxide layer 8 is made of, for example, $SiO_2$ or the like. A fluoride layer may replace the oxide layer 8. The fluoride layer may be made of $MgF_2$ or the like.

Since the dielectric part 4 is provided on the data-recording layer 3, the adhesive does not contact the data-recording layer 3. The organic material of the data-recording layer 3 will not diffuse into the adhesive or react with the adhesive, and will not deteriorate at all.

It is desired that the dielectric part 4 be made of material having a low refractive index. The reason will be described below.

As indicated above, the optical disc 1 needs to have initial reflectance of 15% to 25% in order to meet the standards of the next-generation, high-density optical discs. It can acquire an initial reflectance of 15% to 25% if the organic material has a refractive index of 2.3 or more.

If the data-recording layer 3 is made of organic material that has a refractive index of 2.3 or more, however, the data-recording layer 3 can hardly be sufficiently resistance to heat or weather, exhibit an absorption spectrum suitable for the wavelength of blue laser beams, or be amorphous enough to inhibit noise.

The dielectric part 4 may be made of material having a low refractive index. If this is the case, multiple interference takes place, achieving an optical enhancement effect. Hence, the optical disc 1 can have initial reflectance of 15% to 25% if the data-recording layer 3 is made of material having a refractive index of less than 2.3, too.

Examples of materials having a low refractive index are oxides such as $SiO_2$ and fluorides such as $MgF_2$. A film of $SiO_2$ or $MgF_2$ may be formed by means of vapor deposition, electron-beam vapor deposition, RF-plasma sputtering or the like. Nonetheless, it is desired that the dielectric part 4 be formed by reactive sputtering, in view of the mass-productivity and transparency required of the dielectric part 4.

The dielectric part 4 of the optical disc 1 comprises a nitride layer 7 and an oxide layer 8. The nitride layer 7 is formed on the data-recording layer 3, and the oxide layer 8 is formed on the nitride layer 7. Hence, the oxide layer 8 can be formed by reactive sputtering that utilizes oxygen plasma. This is because the oxygen plasma generated during the reactive sputtering that forms the oxide layer 8 does not deteriorate the organic material of the data-recording layer 3.

As specified above, the dielectric part 4 is a two-layered component made of the nitride layer 7 and the oxide layer 8 and the light-transmitting layer 5 is bonded with adhesive to the dielectric part 4. These structural features prevent deterioration of the data-recording layer 3, as will be explained below in detail with reference to FIGS. 4 to 7. The arrows shown in FIGS. 4 to 7 indicate the reflection and transmission of the light applied to the optical disc 1.

Figure 4:
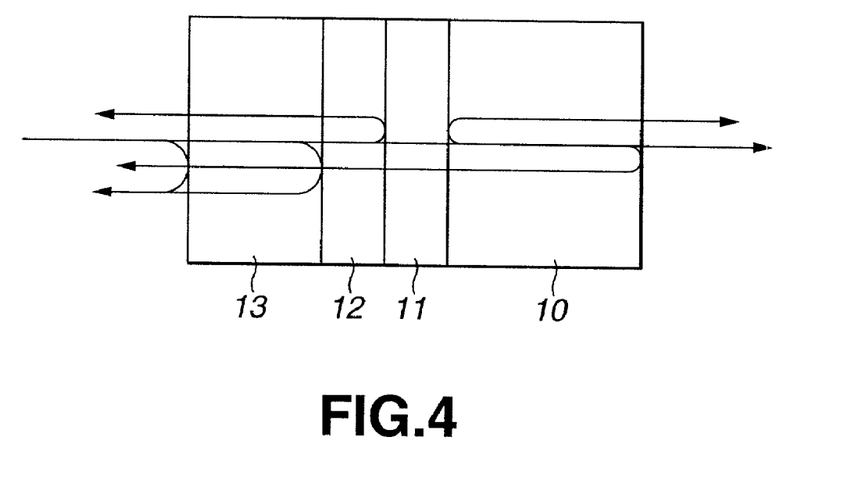
FIG. 4 is a diagram explaining how the reflectance and transmittance of the data-recording layer change when a light-transmitting layer is bonded with adhesive to the data-recording layer.

A first comparative disc was produced. As shown in FIG. 4, the disc comprises a polycarbonate substrate 10, a data-recording layer 11, an adhesive layer 12, and a polycarbonate film 13. The data-recording layer 11, which is 80 nm thick, is provided on the polycarbonate substrate 10. The adhesive layer 12 bonds the polycarbonate film 14 to the data-recording layer 11. A laser beam was applied to the first comparative disc, more correctly to the polycarbonate film 13. The reflectance and transmittance of the first comparative disc were measured from the intensity of the beam reflected from the disc. The results were as shown in Table 1 presented below.

TABLE 1

|  | Value measured | Theoretical value | Inverse value |
|---|---|---|---|
| Reflectance (%) | 9 | 10 | — |
| Transmittance (%) | 70 | 64 | — |
| Absorption coefficient | — | 2.0 | 1.7 |
| Refractive index | — | 0.1 | 0.1 |

As seen from Table 1, the transmittance of the first comparative disc was higher than the theoretical value, while the reflectance of the disc was nearly equal to the theoretical value. This shows that the data-recording layer 11 changed in terms of refractive index and absorption coefficient. In other words, this means that the data-recording layer 11 deteriorated because its material diffused into the adhesive layer 12.

The refractive index and absorption coefficient of the data-recording layer 11 were calculated from the transmittance and reflectance of the first comparative disc. The results were as shown in Table 1, too. Obviously, the refractive index and absorption coefficient of the layer 11 were different from their theoretical values. This indicates that the data-recording layer 11 did not degenerate.

Figure 5:
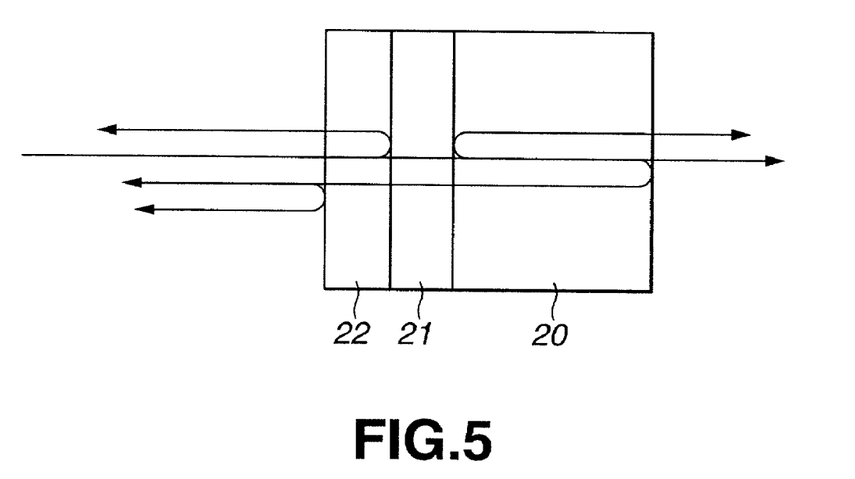
FIG. 5 is a diagram explaining how the reflectance and transmittance of the data-recording layer change when an $SiO_2$ film is provided on the data-recording layer.

A second comparative disc was produced. As shown in FIG. 5, this disc comprises a polycarbonate substrate 20, a data-recording layer 21, and a $SiO_2$ film 22. The data-recording layer 21, which is 100 nm thick, is provided on the polycarbonate substrate 20. The $SiO_2$ film 22, which is 40 nm thick, is provided on the data-recording layer 21. A laser beam was applied to the second comparative disc, more precisely to the $SiO_2$ film 22. The reflectance and transmittance of the second comparative disc were measured from the intensity of the beam reflected from the disc. The results were as shown in the following Table 2.

TABLE 2

|  | Value measured | Theoretical value | Inverse value |
|---|---|---|---|
| Reflectance (%) | 10 | 4 | — |
| Transmittance (%) | 90 | 62 | — |
| Absorption coefficient | — | 2.0 | 1.5 |
| Refractive index | — | 0.1 | 0.0 |

As Table 2 shows, the reflectance and transmittance of the second comparative disc were both greater than the theoretical values. This means that the data-recording layer 21 deteriorated due to the oxygen plasma generated during the process of forming the $SiO_2$ film 22, or due to the changes in the reflectance and absorption coefficient of the layer 21.

The refractive index and absorption coefficient of the data-recording layer 21 were calculated from the transmittance and reflectance of the second comparative disc. The results were as shown in Table 2, too. It is clear that the refractive index and absorption coefficient of the layer 21 were different from their theoretical values. Hence, the data-recording layer 21 did not degenerate.

Figure 6:
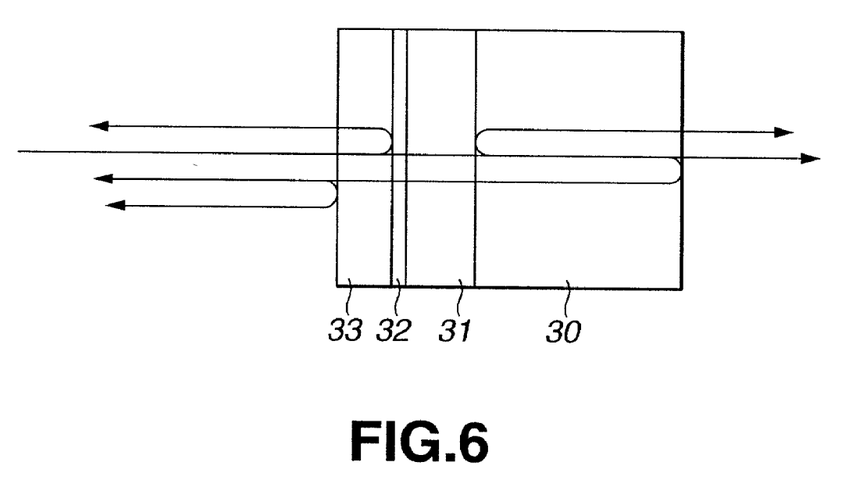
FIG. 6 is a diagram showing how the reflectance and transmittance of the data-recording layer change when an $Si_3N_4$ film is provided on the data-recording layer.

A first optical disc according to the present invention was produced. As illustrated in FIG. 6, the optical disc comprises a polycarbonate substrate 30, a data-recording layer 31, an $Si_3N_4$ layer 32, and an $SiO_2$ layer 33. The data-recording layer 31, which is 100 nm thick, is provided on the substrate 30. The $Si_3N_4$ layer 32 is 5 nm thick and formed on the data-recording layer 31. The $SiO_2$ layer 33 is 35 nm thick and laid on the $Si_3N_4$ layer 32. A laser beam was applied to the first optical disc, more specifically to the SiO2 film 33. The reflectance and transmittance of the first optical disc were measured from the intensity of the beam reflected from the optical disc. The results were as shown in the following Table 3.

TABLE 3

|  | Value measured | Theoretical value | Inverse value |
|---|---|---|---|
| Reflectance (%) | 5 | 4 | — |
| Transmittance (%) | 65 | 62 | — |
| Absorption coefficient | — | 2.0 | — |
| Refractive index | — | 0.1 | — |

As is shown in Table 3, the reflectance and transmittance of the first optical disc were almost equal to the theoretical values. Thus, the data-recording layer 31 did not deteriorated at all.

As can be understood from Table 3, the data-recording layer 31 did not degenerate in the optical disc according to this invention. Moreover, as sown in FIG. 7, a polycarbonate film 35 was bonded to the $SiO_2$ layer 33, with an adhesive layer 34, thus producing a second optical disc according to the invention. A laser beam was applied to the second optical disc, more precisely to the polycarbonate film 35. The reflectance and transmittance of this optical disc were measured from the intensity of the beam reflected from the optical disc. The results were as shown in the following Table 4.

TABLE 4

Figure 7:
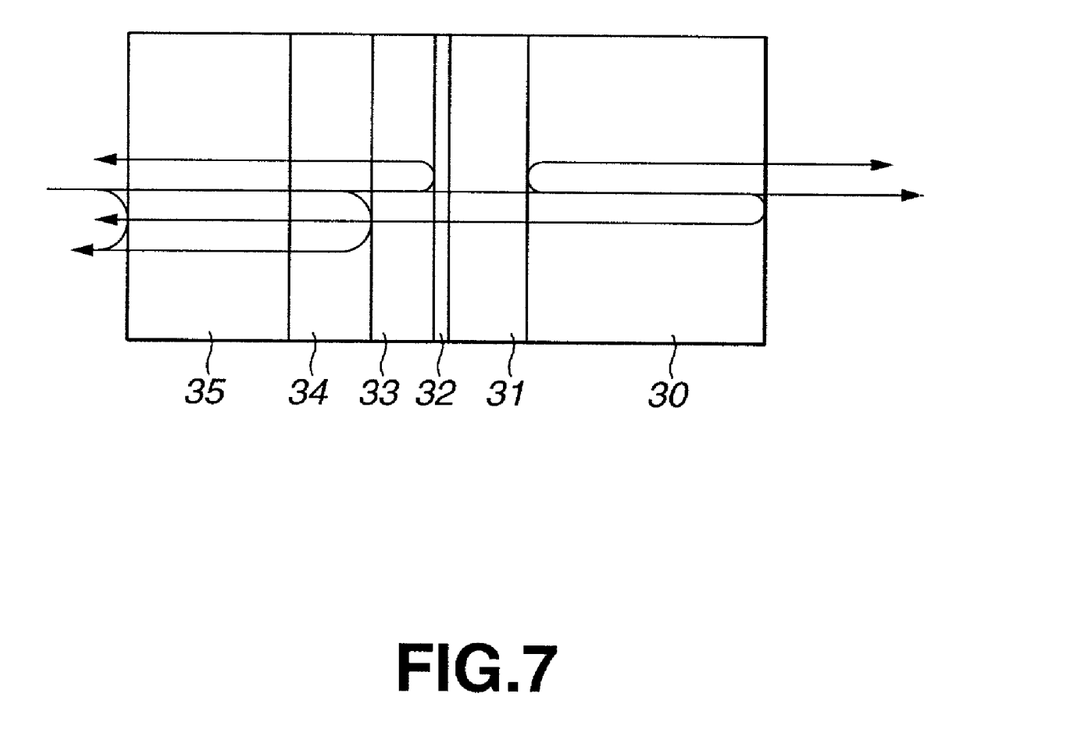
FIG. 7 is a diagram showing how the reflectance and transmittance of the data-recording layer change when an $Si_3N_4$ film and an $SiO_2$ film are formed in the order mentioned, on the data-recording layer, and a light-transmitting layer is bonded to the $SiO_2$ film with adhesive.

|  | Value measured | Theoretical value | Inverse value |
|---|---|---|---|
| Reflectance (%) | 9.5 | 10 | — |
| Transmittance (%) | 64 | 64 | — |
| Absorption coefficient | — | 2.0 | — |
| Refractive index | — | 0.1 | — |

As seen from Table 4, the reflectance and transmittance of the second optical disc were almost equal to the theoretical values. That is, the data-recording layer 31 of the second disc did not deteriorated, either.

In view of the transmittance and reflectance of each of the four discs produced and tested as described above, it has been found that the data-recording layer 3 can be prevented from deteriorating if two requirements are satisfied. First, the dielectric part 4 should comprise a nitride layer 7 and an oxide layer 8. Second, the light-transmitting layer 5 should be bonded with adhesive to the dielectric part 4.

In the optical disc 1 according to this invention, the dielectric part 4 is formed on the data-recording layer 3 and a light-transmitting layer 5 is bonded with adhesive to the dielectric part 4. Therefore, the data-recording layer 3 and the adhesive layer never contact each other. The organic material of the data-recording layer 3 would not diffuse into the adhesive layer. Nor would it react with the adhesive to deteriorate the data-recording layer 3.

In the optical disc 1 of this invention, the nitride layer 7 is formed on the data-recording layer 3 and the oxide layer 8 is formed on the nitride layer 7. This prevents the organic material of the layer 3 from being deteriorated by the oxygen plasma generated during the sputtering performed to form the oxide layer 8.

Generally, nitrides have a large refractive index. To lower the refractive index of the dielectric part 4 it is required that the nitride layer 7 be sufficiently thin. To be more specific, the nitride layer 7 should be 10 nm or less thick. If the nitride layer 7 has a thickness greater than 10 nm, the optical disc 1 can no longer acquire an initial reflectance of 15% to 25%. Why the nitride layer 7 needs to be 10 nm or less thick will be explained below.

Figure 8:
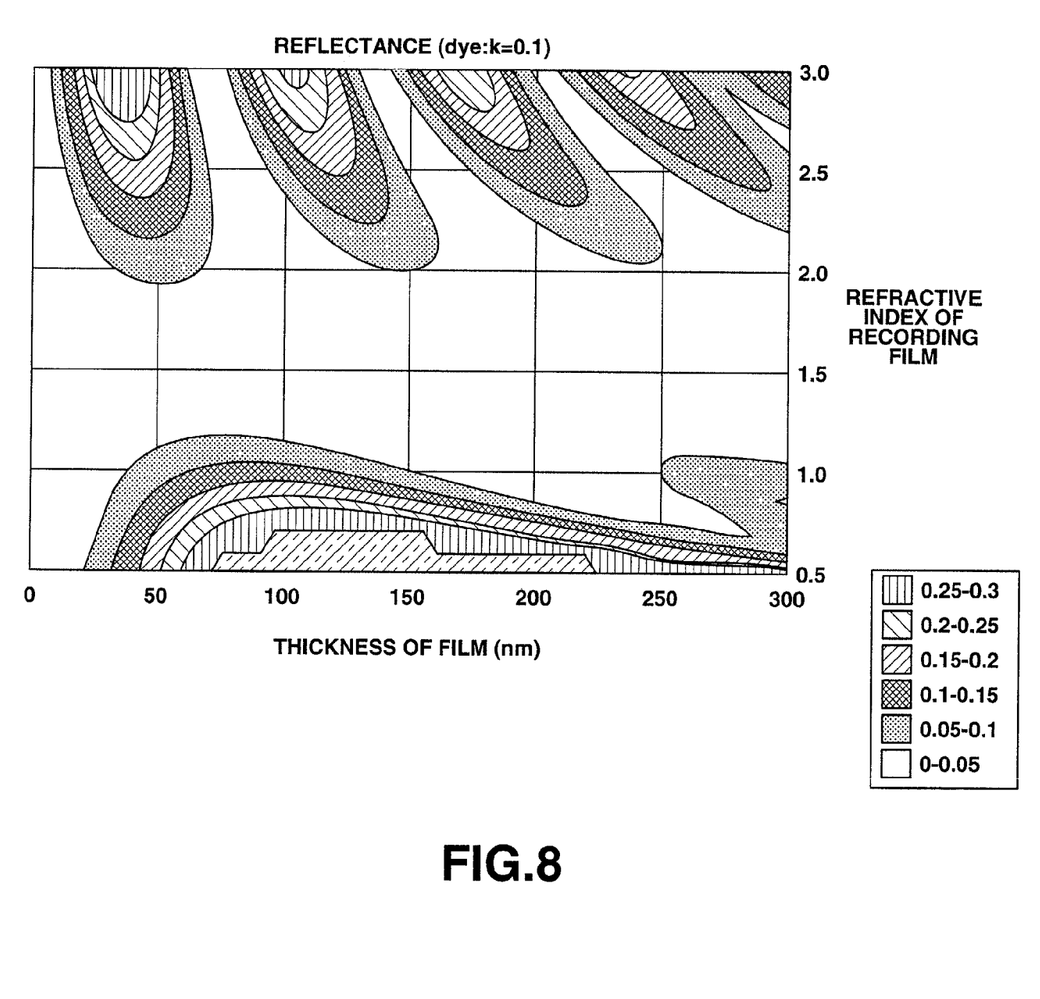
FIG. 8 is a graph representing the relation among the thickness, refractive index and reflectance of the data-recording layer have when no $Si_3N_4$ film is formed on the data-recording layer and a light-transmitting layer is bonded with adhesive to the data-recording layer.
Figure 9:
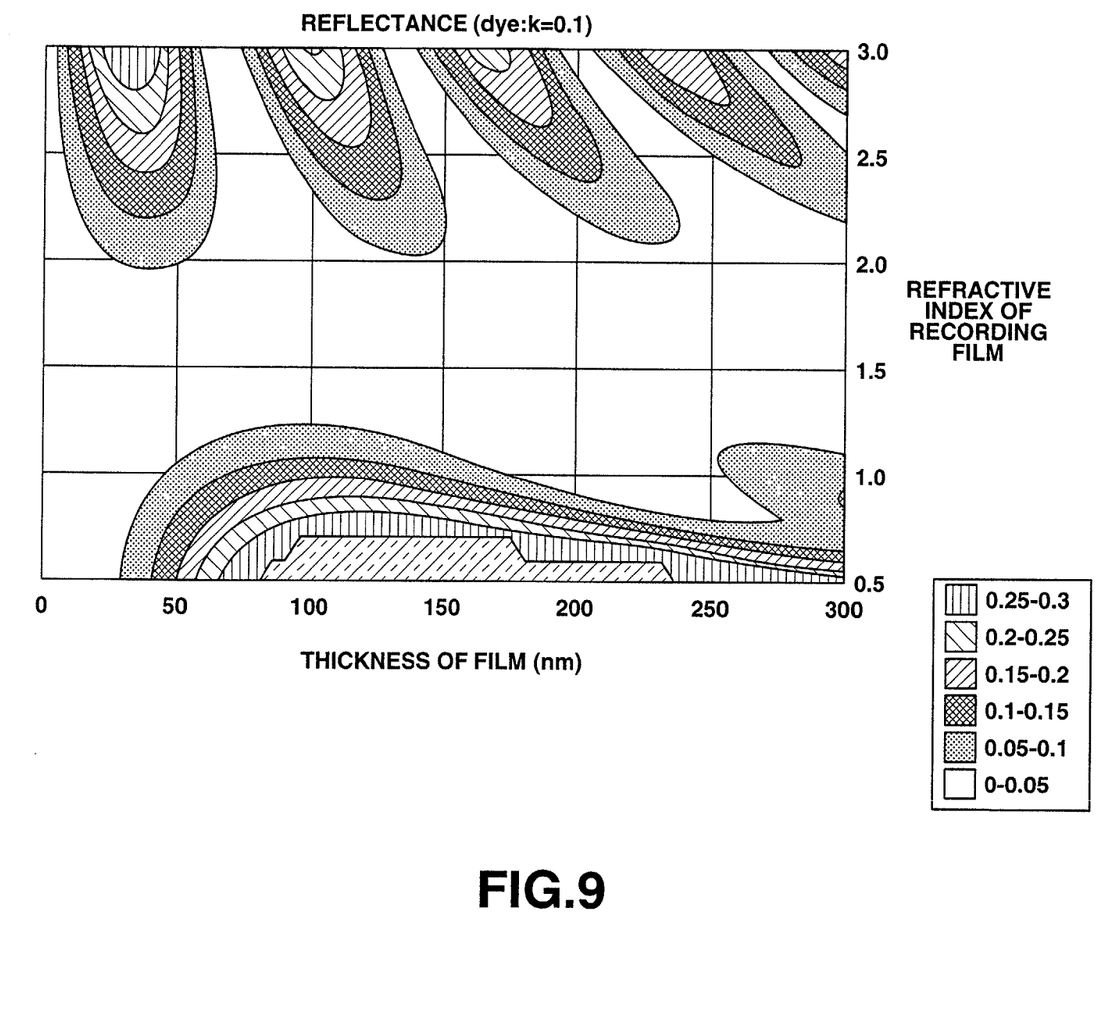
FIG. 9 is a graph showing the relation among the thickness, refractive index and reflectance of the data-recording layer have when an $Si_3N_4$ film having a thickness of 10 nm is formed on the data-recording layer and a light-transmitting layer is bonded with adhesive to the $Si_3N_4$ film.
Figure 10:
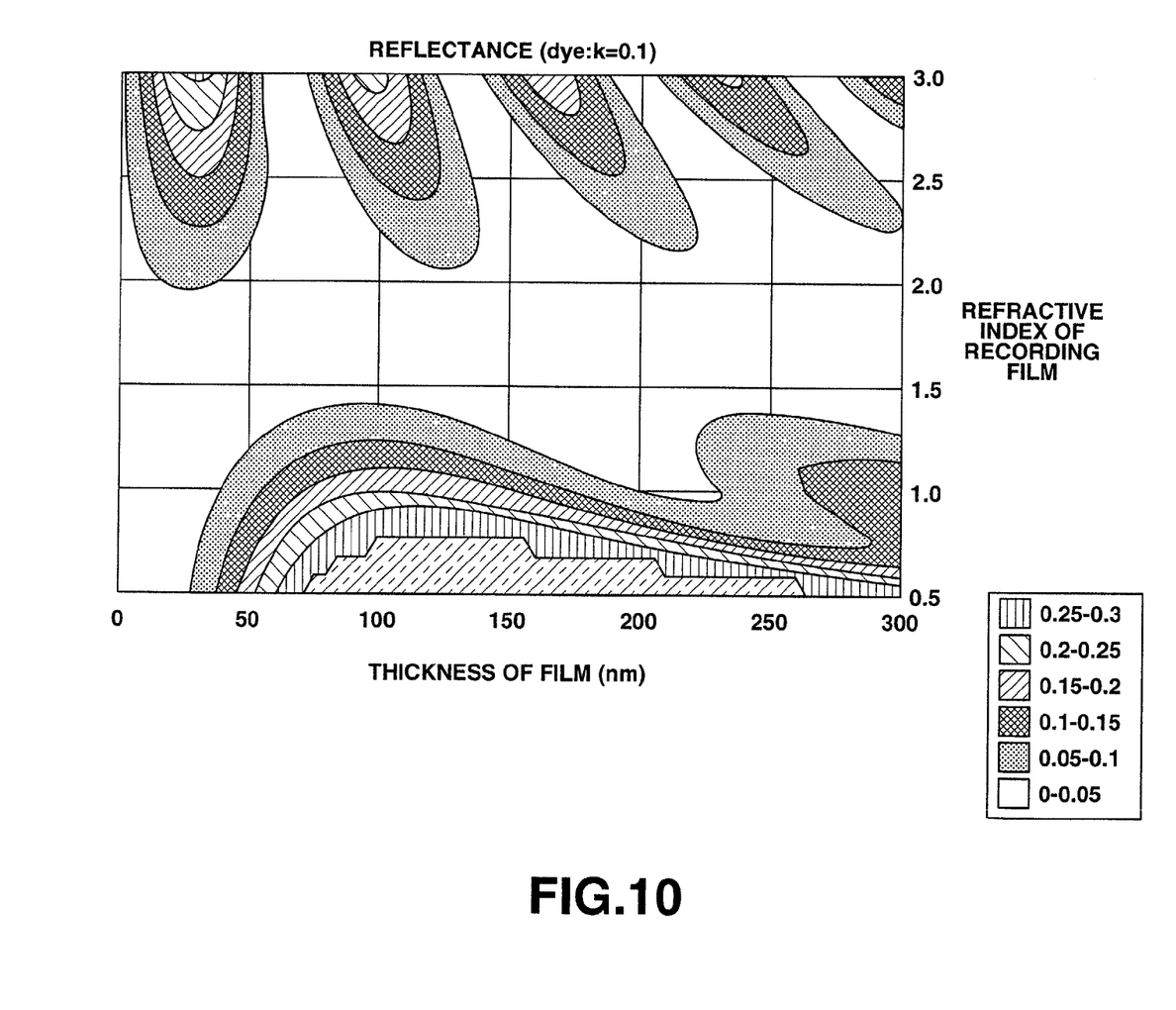
FIG. 10 is a graph showing the relation among the thickness, refractive index and reflectance of the data-recording layer have when an $Si_3N_4$ film having a thickness of 20 nm is formed on the data-recording layer and a light-transmitting layer is bonded with adhesive to the $Si_3N_4$ film.
Figure 11:
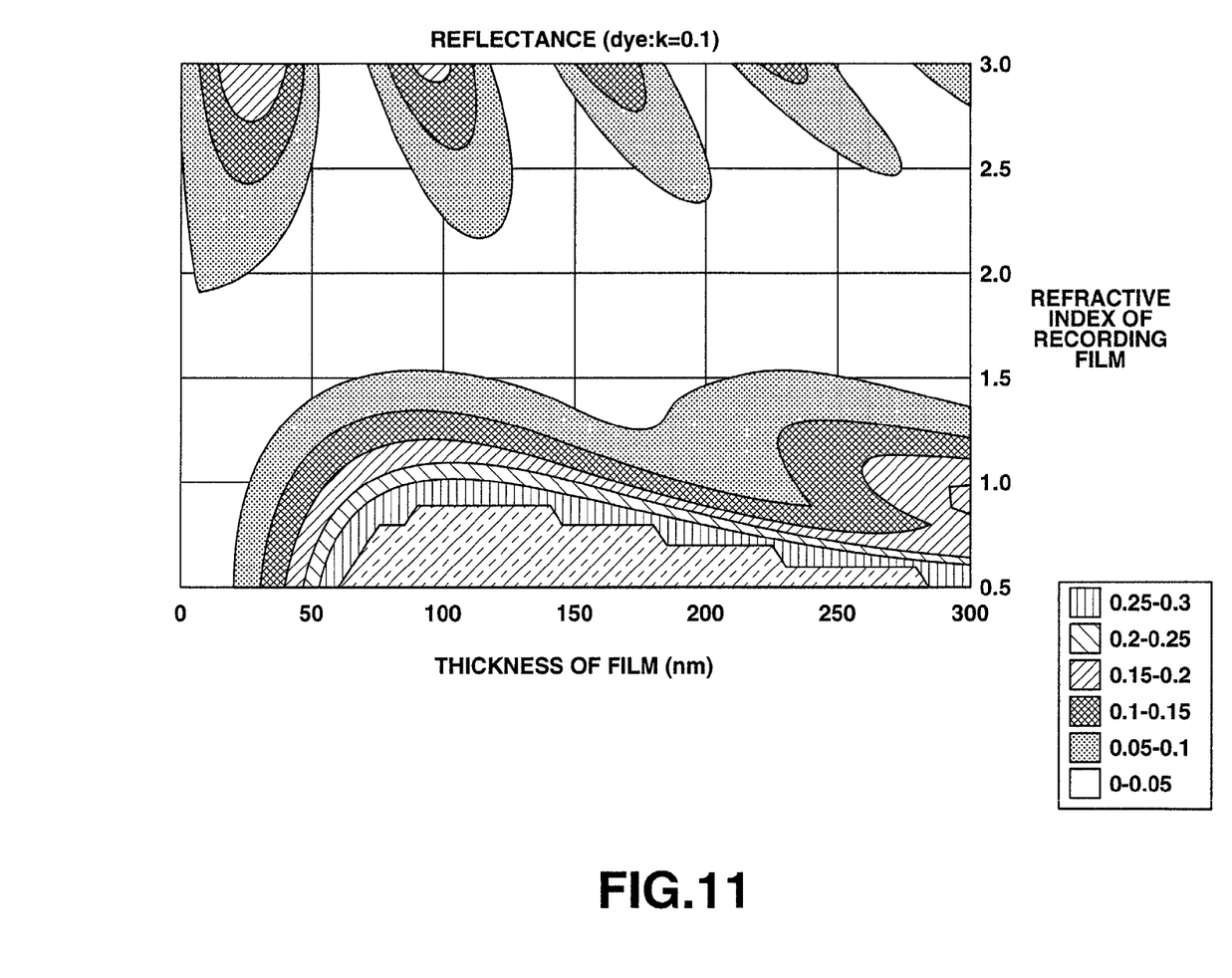
FIG. 11 is a graph showing the relation among the thickness, refractive index and reflectance of the data-recording layer have when an $Si_3N_4$ film having a thickness of 30 nm is formed on the data-recording layer and a light-transmitting layer is bonded with adhesive to the $Si_3N_4$ film.

Simulation was conducted to determine how the reflectance of the structure composed of the data-recording layer 3 and the dielectric part 4 changes with the thickness and refractive index of the layer 3 and, ultimately, to find an optimal value for the thickness of the nitride layer 7. FIGS. 8 to 11 show the results of the simulation. FIG. 8 represents the relation that the thickness, refractive index and reflectance of the data-recording layer have when no $Si_3N_4$ film is formed on the data-recording layer 3. FIGS. 9, 10 and 11 show the relation that the thickness, refractive index and reflectance have when the $Si_3N_4$ film formed on the layer 3 is 10 nm thick, 20 nm thick and 30 nm thick.

Assume the data-recording layer 3 is made of such a material that it acquires refractive index of 2.2 before data is recorded on it and refractive index of 1.7 after data is recorded on it. Then, the greater the change in refractive index, the better signal-reproducing characteristic the optical disc 1 will exhibit.

As shown in FIG. 9, if the $Si_3N_4$ film is 10 nm thick, the refractive index of the two-layered structure changes to almost the same extent as in the case where no $Si_3N_4$ film is formed on the data-recording layer 3. If the data-recording layer 3 is, for example, 40 nm thick, its reflectance is 10 to 15% if it has refractive index of 2.2, and its reflectance is 0 to 5% if it has refractive index of 1.7.

As illustrated in FIG. 10, if the $Si_3N_4$ film is 20 nm thick, the refractive index of the two-layered structure changes less than in the case where no $Si_3N_4$ film is formed on the data-recording layer 3. If the data-recording layer 3 is, for example, 40 nm thick, its reflectance is 5 to 10% if it has refractive index of 2.2, and its reflectance is 0 to 5% if it has refractive index of 1.7.

As seen from FIG. 11, if the $Si_3N_4$ film is 30 nm thick, too, the refractive index of the two-layered structure changes less than in the case where no $Si_3N_4$ film is formed on the data-recording layer 3. If the data-recording layer 3 is, for example, 40 nm thick, its reflectance is 5 to 10% if it has refractive index of 2.2, and its reflectance is 0 to 5% if it has refractive index of 1.7.

As indicated above, if the nitride layer 7 has a thickness of 10 nm or less, the data-recording layer 3 can be prevented from deteriorating despite the oxygen plasma generated during the process of forming the oxide layer 8. In this case, the optical disc 1 can acquire an initial reflectance of 10 to 15%.

If the dielectric part 4 consisted of only the nitride layer 7 that is 10 nm or less thick, it should have but inadequate mechanical strength. As a mater of fact, the dielectric part 4 comprises not only the nitride layer 7 but also the oxide layer 8 formed on the layer 7. The dielectric part 4 therefore has a sufficient mechanical strength.

As specified above, the dielectric part 4 is formed on the data-recording layer 3 and the light-transmitting layer 5 is bonded to the dielectric part 4 with adhesive in the optical disc 1 according to the present invention. Hence, the data-recording layer 3 never contacts the adhesive. The organic material of the layer 3 would not diffuse into the adhesive or react therewith. The data-recording layer 3 would not be deteriorated.

In the optical disc 1 according to this invention, the oxide layer 8 is formed on the nitride layer 7 and the light-transmitting layer 5 is formed on the oxide layer 8. Therefore, the oxygen plasma generated during the process of forming the oxide layer 8 by reactive sputtering does not deteriorate the organic material of the data-recording layer 3. Additionally, the optical disc 1 excels in mass-productivity since the dielectric part 4 can be formed by means of reactive sputtering.

As described above, the oxide layer 8 provided on the nitride layer 7 has a low refractive index. The optical disc 1 of the invention can therefore acquire an initial reflectance of 15% to 25% by virtue of the optical enhancement effect resulting from multiple interference, even if the data-recording layer 3 is made of organic material having a refractive index of 2.3 or less. Further, the nitride film 7 does not hinder the optical enhancement effect in spite of its great refractive index, because its thickness is only 10 nm or less. The reflectance the optical disc 1 acquires after it records data is greatly different from the reflectance it exhibits before it records the data. This increases the C/N (signal-to-noise) ratio. Thus, the optical disc 1 can have desirable signal-reproducing characteristic.

As indicated above, the light-transmitting layer 5 is bonded to the dielectric part 4, with adhesive in the optical disc 1 of the present invention. In view of this, too, the optical disc 1 excels in mass-productivity. The disc 1 can therefore be manufactured at low cost.

According to the present invention, the nitride layer 7 and the oxide layer 8 can be made of $Si_3N_4$ and $SiO_2$, respectively. Namely, both layers 7 and 8 can be made of silicon-based materials that are relatively inexpensive. This helps to reduce the manufacturing cost of the optical disc 1.

The layer 7 and 8 should better be made of nitride and oxide of the same element, respectively, for example $Si_3N_4$ and $SiO_2$, respectively. If so, the nitride layer 7 and the oxide layer 8 can be continuously formed in the order they are mentioned, merely replacing nitrogen gas by oxygen gas immediately after the nitride layer 7 has been formed.

EXAMPLE

An optical disc was made according to the present invention, and its initial reflectance and signal-reproducing characteristic were determined, as will be described below.

First, a polycarbonate substrate having a thickness of 1.2 mm was made by means of injection molding.

Next, the polycarbonate substrate was coated with a solution prepared by dissolving a cyanine-based photosensitive organic dye in tetrafluoropropanol, by means of spin coating. A coating of about 40 nm thick was thereby formed on the polycarbonate substrate.

Radiofrequency (RF) sputtering was performed on the resultant structure by using a silicon target, Ar gas and $N_2$ gas, forming a transparent $Si_3N_4$ film having a thickness of 5 nm. Ar gas and $N_2$ gas were used in amounts of 32 sccm and 8 sccm, respectively. The total gas pressure was 3 mTorr, and the RF power was 60 mW.

Then, the $N_2$ gas was replaced by $O_2$ gas and reactive sputtering was carried out. A transparent $SiO_2$ film having a thickness of 25 nm was thereby formed. During this process, Ar gas and $O_2$ gas were used in amounts of 16 sccm and 4 sccm, respectively, the total gas pressure was 1.5 mTorr, and the RF power was 50 mW.

Finally, a polycarbonate sheet about 100 μm thick was coated with adhesive and press-boned to the $SiO_2$ film by means of press-defoaming method.

The optical disc thus made tested for its signal-reproducing characteristic by use of an apparatus that comprises a laser emitting a 405 nm beam and an objective lens having an NA of 0.85. The optical disc exhibited an initial reflectance of 15%, a linear speed of 5 m/s, and C/N of 50 dB or more when data was recorded on the disc in the form of 0.4 μm marks.

As seen from the test results, the optical disc according to this invention can have an initial reflectance of 15% to 25%, can record signals in high C/N more than 50 dB and can therefore exhibit good signal-reproducing characteristic.

The present invention is not limited to the example described above. Various changes and modifications can, of course, be made without departing from the scope and spirit of the invention.

What is claimed is:

1. An optical disc in which data signals are recorded and reproduced by applying a laser beam having a wavelength of 380 nm to 450 nm to a data-recording layer and the reflectance is 15% to 25% to the beam having the wavelength, before the data signals are recorded, and is 0% to 10% after the data signals are recorded, the optical disc comprising:

a substrate;

a data-recording layer made of organic dye material directly formed on the substrate;

a dielectric part on the data-recording layer; and a light-transmitting layer on the dielectric part and adhered to the dielectric part with an adhesive agent, wherein the data signals are recorded by applying the laser beam to the data-recording layer through the light-transmitting layer, the dielectric part comprises a nitride layer contacting the data-recording layer and an oxide layer or a fluoride layer laid on the nitride layer, and the nitride layer has a thickness of at most 10 nm.

* * * * *